Jan. 26, 1965  J. O. BENSON  3,167,035
CONTINUOUS ENROBING-MACHINE
Filed Sept. 1, 1960  2 Sheets-Sheet 2
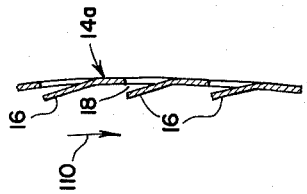
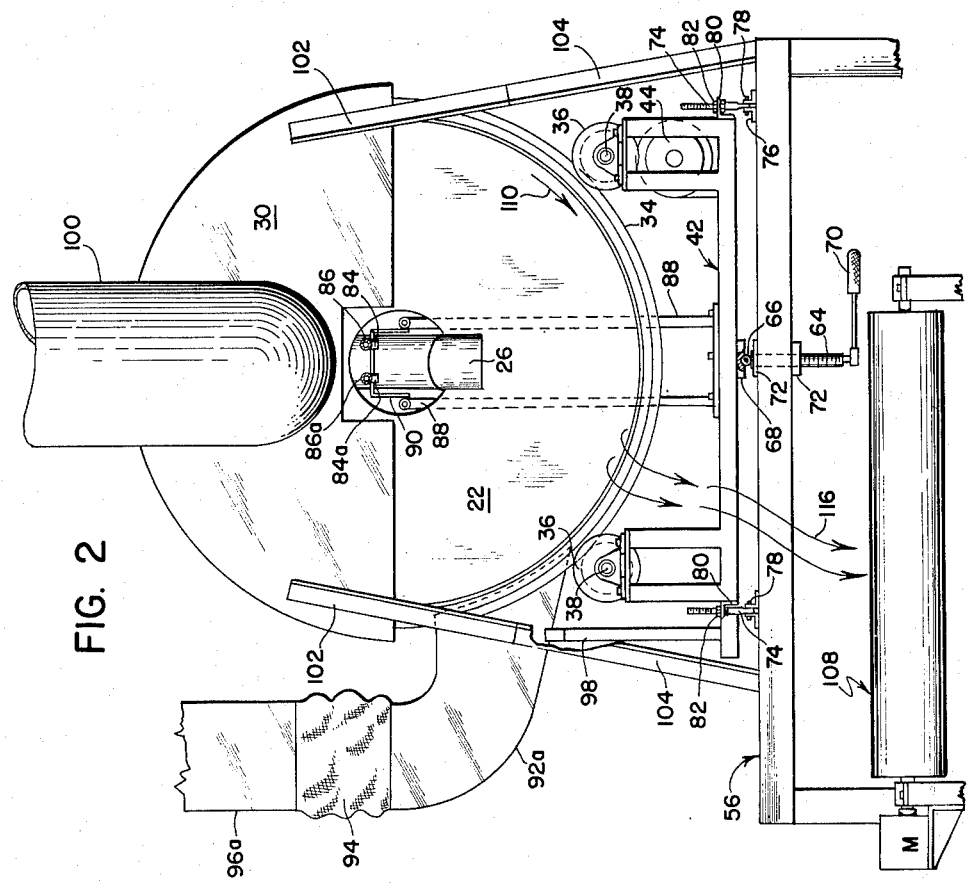
INVENTOR.
JOHN O. BENSON
BY
Stuart R. Peterson
ATTORNEY United States Patent Office 3,167,035
Patented Jan. 26, 1965

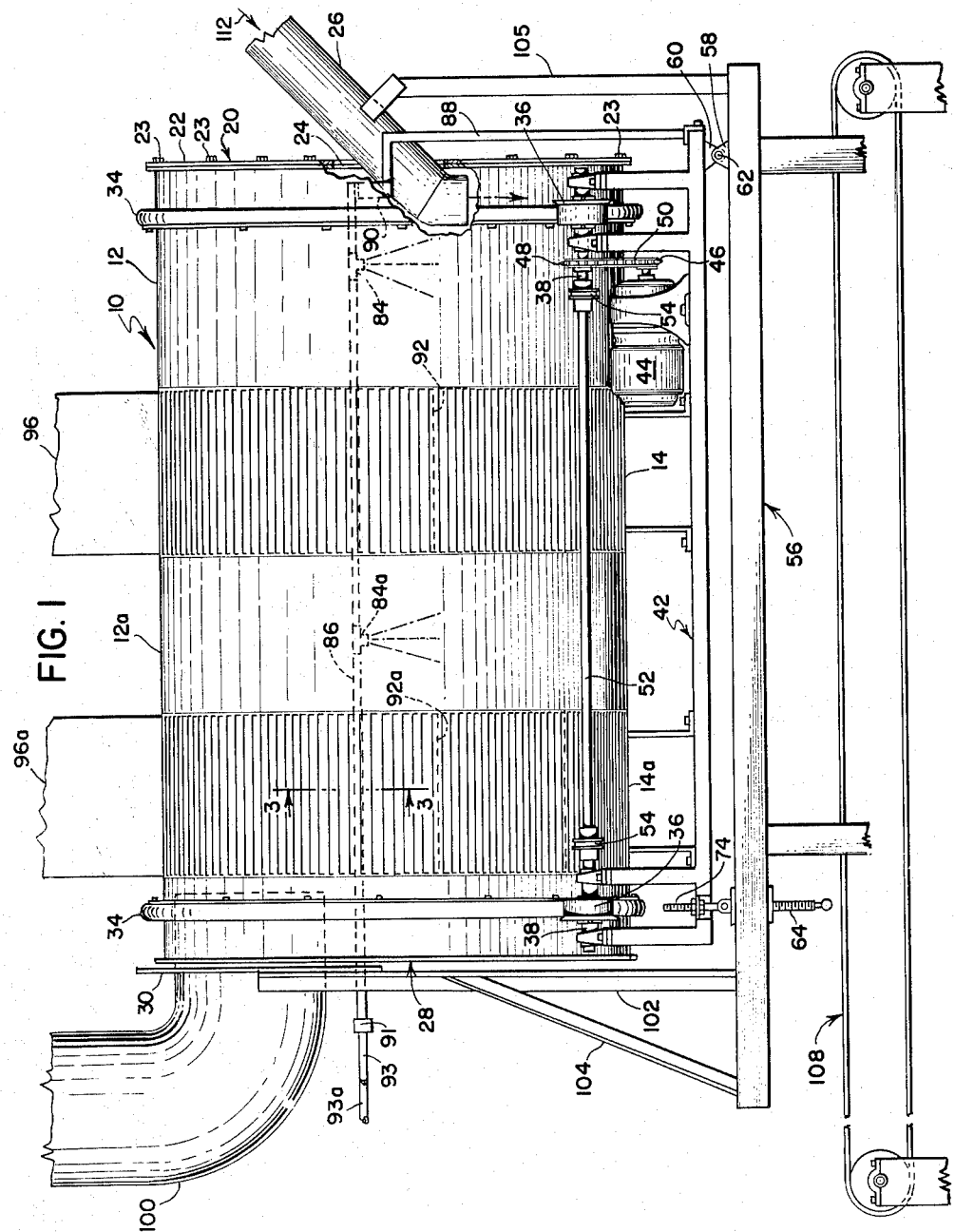

3,167,035
CONTINUOUS ENROBING MACHINE
John O. Benson, Mayer, Minn., assignor to General Mills, Inc., a corporation of Delaware
Filed Sept. 1, 1960, Ser. No. 53,437
5 Claims. (Cl. 107—54)

This invention relates generally to the sugar coating or enrobing of ready-to-eat cereal products and the like and pertains more specifically to a machine that accomplishes the enrobing of such products in a continuous manner.

One of the greatest problems in the enrobing of cereal products (including popcorn) has been the tendency for the pieces to stick together or agglomerate. To have an acceptable end product, it is mandatory that agglomeration be obviated.

Accordingly, one object of the invention is to provide apparatus that maintains the product in an individual or free flowing state during the coating or enrobing process.

Another object of the invention is to provide a machine that will coat different types of cereal products. For instance, it is an aim of the invention to apply a sugar coating to relatively fragile cereal flakes as well as to puffed pellets, the machine of the instant invention minimizing the likelihood of breakage even with the most frangible type of cereal.

Another object is to provide a machine that can be adjusted to perform the continuous enrobing procedure at a controlled rate most suitable for the product being coated, the uncoated cereal product being fed into one end of the machine and discharged in a coated form at the other end after an appropriate transit period has elapsed.

A further object is to provide a continuous enrobing machine in which it is desirable to maintain specific ranges of temperature, flow rates, speeds, moisture content, and the like but in which such operating characteristics can be varied considerably as compared to previous procedures. In other words, greater operating tolerances are possible with the instant invention as compared to prior art techniques, although such operating characteristics may have optimum values or ranges which should be utilized where possible and practical to do so.

Yet another object is to provide a continuous enrobing machine that can be made to apply the coating in successive stages. By so doing, a reduction in moisture added per stage can be realized thereby reducing the lessening shrinkage of the cereal product. The desirability for applying the syrup or slurry in stages is particularly important where puffed pellets are involved, for such cereal is particularly susceptible to shrinkage.

The invention also has an an object the provision of an enrobing machine that is quite simple, low in cost, and of rugged construction.

A still further object of the invention is to provide a machine of the foregoing characteristics which is completely sanitary, being easily cleaned and serviced as circumstances dictate.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings, FIGURE 1 is a side elevation illustrating one form my invention may assume, FIGURE 2 is an end view of the machine depicted in FIGURE 1, the view being taken from the left of FIGURE 1, and FIGURE 3 is an enlarged cross-sectional view of a segment of the louvered section of the machine taken in the direction of line 3—3 of FIGURE 1.

Referring now in detail to the drawings, the enrobing machine exemplifying my invention comprises a rotatable drum to which includes a first imperforate cylindrical section 12, a perforate section 14, a second imperforate cylindrical section 12a, and a second perforate section 14a. As will become clearer later, each imperforate and perforate section serves as a single stage. Thus two stages have been illustrated, although others may be added.

As best viewed in FIGURE 3 the perforate sections 14 and 14a are formed with a series of louvers 16 which are inwardly bent so as to provide a corresponding number of longitudinal slits 18.

The right end of the machine as viewed in FIGURE 1 is the inlet end and has been designated by the numeral 20. This end 20 is covered by an end plate 22 which is removably attached to the drum 10 by means of a plurality of bolts 23. From both FIGURES 1 and 2, it can be discerned that the end plate 22 has a central opening 24. Into this opening 24 projects a cereal supply pipe 26.

The other end of the machine is the discharge or outlet end and has been assigned the numeral 28. A semi-circular plate 30 covers the upper half of the outlet end 28. The specific manner in which this plate is mounted in relation to the drum 10 will be discussed in more detail hereinafter, although it should be understood that the means for holding the plate 30 in place is susceptible to rather wide variation. It should be noted at this time that the semicircular configuration of the plate 30 leaves an open bottom therebeneath which is likewise of semicircular configuration inasmuch as the plate 30 covers only one-half of the outlet end 28.

A pair of circumferential tracks 34 are situated adjacent the ends 20 and 28 of the drum 10. These tracks permit the rotation of the drum 10 about its longitudinal axis. Cooperating in this achievement are four, flanged wheels 36, each of which is mounted on a relatively short shaft 38 journaled in pillow block bearings 40.

The flanged wheels 36 are actually carried on a bed frame or cradle designated generally by the reference numeral 42. The frame 42 supports a drive motor 44 for the two flanged wheels 36 nearest the viewer in FIGURE 1. The motor 44 has a sprocket 46 and a similar sprocket 48 is fixedly mounted on one of the relatively short shafts 38. Entrained about these sprockets 46, 48 is a chain 50 for transmitting rotary motion from the drive motor 44 to the shaft 38 at the right in FIGURE 1. For the purpose of transmitting the motion imparted to the shaft 38 mentioned just above is a relatively long connecting shaft 52, the shaft 52 being mechanically connected between the two shafts 38 appearing in FIGURE 1 by means of a pair of flexible couplings 54.

Subjacent the bed frame or cradle 42 is a base frame or foundation denoted in its entirety by the reference numeral 56. Although the reason for the adjustment will be better understood as the description progresses, nonetheless it will be explained that the drum 10 is tiltable from a truly horizontal position to one in which the outlet end 28 is raised. The angular adjustment is preferably from 0° to 8°. The means for effecting the above alluded to adjustment is derived from a pair of pivot brackets 58 located adjacent the inlet end 20 of the drum 10 but fixed to the base frame 56. A somewhat similar pair of pivot brackets 60 depend downwardly from the outside of the bed frame 42. Through the agency of pivot pins 62 passing through these brackets 58, 60, this particular end of the machine is made pivotal.

Concentrating attention now on the other end, which is the outlet or discharge end labelled 28, it will be seen from FIGURE 2 that a vertically disposed threaded lifting shaft 64 is employed. This shaft 64 has an upper ball end 66 which is received in a socket member 68 fixedly carried on the underside of the bed frame 42. By means of a ratchet handle 70 at the lower end of the shaft 64, the shaft may be rotated so as to advance or retract the shaft with relation to a pair of tapped pads or blocks 72 fixedly disposed on the frame 56. In this way, the outlet end 28 can be elevated with respect to the inlet end 20, pivoting taking place about the previously mentioned pivot pins 62.

A pair of hold-down threaded studs 74 are used in anchoring the base frame 42 after adjustment has been made by the lifting shaft 64. These hold-down studs 74 have their lower ends pivotally attached to clevises 76 affixed to the base or foundation frame 56 through the medium of pins 78. Apertured angled brackets 80 on either side of the frame 42 encircle the studs 74. When the hold-down nuts 82 are tightened against the brackets 80, it will be appreciated that the frame 42 is made rigid with respect to the frame 56.

The enrobing or coating action is derived from one or more spray nozzles 84 situated within the imperforate section 12 of the drum 10 and in the illustrated instance from one or more such nozzles 84a located within the imperforate section 12a. These spray nozzles of the desired type are quite conventional and may be of the design illustrated in Patent 2,305,210 issued December 15, 1942 to F. W. Wahlin. The spray nozzles 84 and 84a pictured in the drawing are attached to removable supply pipes 86 and 86a, respectively which extend horizontally into the drum 10 from the left or outlet end thereof. While not important to an understanding of the invention, it will be observed that a spray pipe support 88 is carried by the bed frame 42 and this support 88 has mounted at its upper end an inverted U-shaped bracket 90 serving as a rest for the end of the supply pipe 86 nearest the inlet end 20 of the rotatable drum 10. In order to perform a ready cleaning of the nozzles 84 and 84a, a union 91 is employed in conjunction with each pipe 86, 86a on the outside of the drum 10 adjacent its outlet end 28, the unions being connected to pipes 93 and 93a leading from two sources of sugar slurry or syrup, one typical syrup being mentioned hereinafter. While two slurry sources have been referred to, it will be appreciated that the nozzles 84, 84a may be connected to a single source, if desired.

In order to achieve a drying action of the cereal product after being coated by the syrup dispensed through the spray nozzle 84, a hot air inlet 92 is mounted at one side of the perforate or louvered section 14 and a similar inlet 92a disposed with respect to the section 14a. These hot air inlets 92 and 92a are connected to individual expansion joints 94 which are in turn connected to supply ducts 96 and 96a leading from a hot air source (not shown). A suitable pipe support 98 is utilized which assures that the hot air inlet 92 will be held in juxtaposition with respect to the perforate section 14. Inasmuch as the drum 10 is to be tilted upwardly at its outlet end 28, the pipe support 98 is located on the bed frame or cradle 42 so as to be moved therewith during the pivoting or tilting of the drum 10.

For the most part, the cumulative exhaust from the louvered sections 14 and 14a is directed into an exhaust duct 100 which passes through the semicircular plate 30 and leads to a dust collector (not shown) or the like. While not at all important to an appreciation of the instant invention, the illustrated means for retaining the plate 30 in close proximity with the outlet end 28 of the drum 10 includes upright angle irons 102 welded at their lower ends to the base frame 56 and having their upper ends similarly secured to the face of the plate 30. Reinforcing the members 102 are braces 104, likewise carried by the base frame 56. Also susceptible to various designs is the pipe support 105 for the cereal supply pipe 26, this support being also mounted on the frame 56.

In order to remove the cereal product discharged via the outlet end 28, a conveyor designated generally by the reference numeral 108 is located subjacent the outlet end 28. The dried cereal product merely drops onto this conveyor and is thereby removed for either packaging or further drying if additional drying is deemed desirable or necessary.

Having presented the foregoing detailed information, the operation of my enrobing machine should be readily apparent. In placing the machine in operation, it is to be observed that the direction of rotation of drum 10 is in a clockwise direction as viewed in FIGURE 2, the arrow denoting the rotation direction having been assigned reference numeral 110. In this regard, attention is also called to FIGURE 3 where the arrow 110 again appears. It is to be observed from FIGURE 3 that the various louvers 16 are bent inwardly and that the free edges of these louvers trail the connected or joined edges. The reason for this will be understood in conjunction with the operational portion dealing with the drying action.

As seen in FIGURE 1, the cereal supply pipe 26 is intended to direct the cereal to be coated into the rotating drum 10. The direction that the cereal takes through the pipe 26 has been indicated by the arrow 112. It will be appreciated that the pipe 26 is connected to a suitable hopper in which the cereal product is temporarily stored. The pipe 26 directs the cereal product into the imperforate section 12 where it is tumbled about by virtue of the rotating cylinder wall constituting this section. If the axis of the drum 10 is truly horizontal, it will be realized that the flow of the cereal through the drum is at a faster rate than when the outlet end 28 of the drum is elevated.

The cereal within the first imperforate section 12 is subjected to the atomized sugar slurry or syrup sprayed from the nozzle 84. Inasmuch as the cereal is constantly being tumbled, the various surfaces of the individual pieces of cereal, either in flake or pellet form, are exposed to the atomized spray. Consequently, a uniform sugar coating is applied to the cereal.

The cereal is constantly advanced through the section 12, receiving the sugar solution while traversing this section, and is moved into the perforate or louvered section 14 where it is subjected to the heat air directed into the section via the hot air inlet 92. Initial drying and attendant crystallization thus occur in this first stage. The temperature of the air will of course depend on the type of syrup utilized and also the type of product being enrobed. As a general guide, though, the air temperature will be usually about 180° F. and will not normally exceed a maximum of 200° F. The rate of air flow will depend upon the specific gravity of the cereal product and will be of the order of 750 cubic feet per minute. It will be understood that the air velocity should not be so great as to blow the cereal product about while within the section 14. It will also be appreciated that the respective lengths of the sections 12 and 14 may be varied to suit specific conditions, as well as their diameter.

Whereas sections 12 and 14 constitute the first stage in the exemplary embodiment, the second stage is composed of sections 12a and 14a. Upon leaving section 14 of the first stage, the cereal product immediately enters the section 12a where it is subjected to treatment similar to that which it received in the first stage. From the earlier portion of this specification it will be recalled that sometimes it is desirable not to add too much moisture with the slurry at one time, shrinking usually occurring when this is done. Consequently, the slurry added by way of the second stage 12a, 14a builds up the coating applied in the first stage 12, 14. The use of the separate supply pipe 86a permits not only the moisture content of the slurry fed through this pipe to be different from that delivered via pipe 86, but the ingredients might well be varied, even to the extent of forming an entirely different syrup. The general action in both of the depicted stages, however, is virtually the same—application of an atomized syrup while the cereal is being tumbled followed by a drying step.

The path of discharge of the enrobed cereal product from the second stage section 14a has been indicated by arrows 116, it being intended that the cereal merely drop onto the conveyor 108. As already indicated, if further drying is needed, such drying can be accomplished by having the conveyor 108 pass through an appropriate oven.

Up to this point very little has been said concerning the type of cereal product that can be enrobed with the instant machine. This is so inasmuch as various cereal products, including popcorn, can be processed with a machine of the envisaged type. It should be stressed, however, that the machine is particularly suited for handling rather fragile flakes and at the same time assuring that these flakes will be coated uniformly with the sugar syrup. The gentle jostling or tumbling action produced is not of such severity that the flakes will become broken. Hence, the machine produces a high quality coated product with both flakes and puffed pellets.

It might be mentioned that the sugar slurry or syrup is capable of rather wide variations as to the ingredients constituting same. One sugar slurry or solution that has been utilized is a slurry comprised of 75% sugar (sucrose) and 25% water. However, corn syrup can be added to the slurry if desired and appropriate flavoring can also be introduced via this medium. It is of importance that the syrup or slurry temperature be sufficient to perform ready atomization at the nozzle 84. A range of 250–280° F. would normally be satisfactory with a temperature of 260° F. being generally ideal. The nozzle pressure will depend upon the type of nozzle utilized but will normally be in the range of 35–40 p.s.i. As previously indicated, two different syrups may be utilized, if desired.

It has already been stated that the outlet end 28 can be elevated as much as 8°. The greater the angle of elevation, the longer the transit time and the longer the cereal material remains in the sections 12, 14, 12a and 14a. The rate or feeding the slurry can be adjusted accordingly and also the drying rate can be at least partially based on the moisture content of the selected slurry for each stage. Should additional drying be necessary after the drying realized in the louvered sections 14, 14a such can be accomplished with the conveyor 108 as already mentioned. The instant machine need for only assure sufficient drying to avoid tackiness.

The dimensions of the drum 10 will depend upon the production rate and will also be influenced by other factors. It can be pointed out, though, that the drum might have a length of, say, 6½ feet and a diameter, of say, 5½ feet. These dimensions are of course quite arbitrary and are only given as a rough guide, particularly inasmuch as the length of the louvers 16 of each section 14, 14a can be designed to suit best the conditions at hand. Also, the rate of rotation of the drum 10 is selected in accordance with the type of cereal being processed, a rate of rotation for a drum having the foregoing dimensions being on the order of 8–9 r.p.m.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A method of enrobing cereal products comprising the steps of spraying an atomized sugar solution onto a cereal product as it passes through an imperforate longitudinal section of a rotating drum at a rate sufficient to only coat said product, and then directing a drying medium inwardly through a perforate longitudinal section of said rotating drum to remove moisture from said cereal product as it passes longitudinally through this latter section.

2. The method of claim 1 including the further steps of spraying an additional limited amount of atomized sugar solution onto the previously coated cereal product as it passes through a second imperforate longitudinal section of said rotating drum, and thereafter directing a drying medium inwardly through a second perforate longitudinal section of said rotating drum to dry the cereal product after the second spraying step.

3. A method of enrobing cereal products comprising the steps of simultaneously tumbling the cereal products and spraying an atomized sugar solution onto a cereal product as it passes through an imperforate longitudinal section of a rotating drum at a rate sufficient to only coat said product and then directing a drying medium inwardly through a perforate longitudinal section of said drum to remove moisture from said cereal products as it passes longitudinally through the perforate section.

4. A continuous enrobing machine for coating cereal products comprising a cylindrical drum rotatable about a generally horizontal axis and having an inlet and an outlet, a series of circumferentially spaced louvers formed from the wall of the drum and extending inwardly from the wall to form a perforate section near said outlet, said drum having an imperforate section near said inlet, means for feeding the cereal product to be enrobed into the inlet of the drum for subsequent discharge at the outlet, a spray nozzle disposed within said drum in spaced relation with the drum walls in said imperforate section for discharging an atomized sugar solution to coat the cereal product, means for supplying the sugar solution to the nozzle, means for rotating said drum to tumble said product, and means for forcing air inwardly through said perforate section to remove moisture from said cereal product as it passes longitudinally through said perforate section toward said outlet.

5. A continuous enrobing machine in accordance with claim 4 in which said louvers constitute a displaced section of the drum wall which extend inwardly at an angle and in a straight line projection from the wall.

References Cited in the file of this patent

UNITED STATES PATENTS

| | | |
|---|---|---|
| 1,500,974 | Webster | July 8, 1924 |
| 2,020,960 | Pehrson et al. | Nov. 12, 1935 |
| 2,196,395 | Kellogg | Apr. 9, 1940 |
| 2,324,874 | Peters | July 20, 1943 |
| 2,450,681 | Muench | Oct. 5, 1948 |
| 2,709,833 | Wiklund | June 7, 1955 |

FOREIGN PATENTS

| | | |
|---|---|---|
| 457,227 | Canada | June 7, 1949 |
| 1,020,552 | Germany | Dec. 5, 1957 |
| 22,177 | Great Britain | Oct. 20, 1908 |